United States Patent [19]
Jaksa

[11] Patent Number: 5,908,145
[45] Date of Patent: Jun. 1, 1999

[54] PNEUMATIC TIRE SEALANT DISPENSER

[76] Inventor: Martin E. Jaksa, 267 Canterbury Rd., Westfield, N.J. 07090

[21] Appl. No.: 08/971,289

[22] Filed: Nov. 17, 1997

[51] Int. Cl.⁶ ...................................................... B65B 1/04
[52] U.S. Cl. ............................................. 222/394; 141/38
[58] Field of Search .............................. 222/394, 400.7; 141/38

[56] References Cited

U.S. PATENT DOCUMENTS

| | | | |
|---|---|---|---|
| 1,492,838 | 5/1924 | Dilweg | 141/38 |
| 5,070,917 | 12/1991 | Ferris et al. | 141/38 |
| 5,386,857 | 2/1995 | Fogal, Sr. et al. | 141/38 |

*Primary Examiner*—Steven O. Douglas
*Attorney, Agent, or Firm*—Charles I. Brodsky

[57] ABSTRACT

A housing of length and cross-sectional dimension to enclose a given amount of tire sealing fluid is selected, coupled with a flexible hose at its output port with a pneumatic tire valve, and charged at its input port from a source of compressed air to inject the tire sealing fluid within the housing by means of the hose through the pneumatic valve to protect a tire against later blowouts or puncturing in use. In a preferred embodiment, the housing is constructed of a polyvinylchloride tube, while the hose is constructed of a clear vinyl composition.

7 Claims, 1 Drawing Sheet

PNEUMATIC TIRE SEALANT DISPENSER

FIELD OF THE INVENTION

This invention relates to pneumatic tires, in general, and to a means of protecting against blowouts or punctures of such tires in use, in particular.

BACKGROUND OF THE INVENTION

As is known, one of the more recent advances in the automotive industry is the development of pneumatic tire sealants to prevent punctures before they occur. In their most usual form, these sealants are viscous fluids, with chunks of raw rubber injected through the tire valve to seal punctures generally up to ¼ in. diameter. While experience has shown that these tire sealants do, in fact, perform the function for which they are intended, the manner of injecting them through the tire valve leaves much to be desired.

To be more specific, such tire sealants as are commercially available typically are sold in 8 oz. containers, 1 gal. jugs and 5 gal. buckets. Injecting the sealant through the valve entails filling the 8 oz. container with this chunking, viscous fluid, fitting a small length of tubing at one end over a tapered spout at the top of the container, inverting the container and coupling the other end of the tubing over the tire valve, and then squeezing the container to force the fluid through the tubing and into the tire. While, in theory, this procedure should work adequately well, actual usage has shown that it is a hard job to do—squeezing the container too hard shoots the fluid beyond the tire valve and onto the ground, while squeezing the container too easily lengthens the time to discharge fully the container's contents. Although an 8 oz. container may be sufficient to charge a medium size passenger car tire, off-the-road vehicle tires typically require 16 ounces of fluid, while truck tires usually take 36 ounces of this viscous liquid. In these instances, the 8 oz. container has to be filled and refilled from the 1 gal. jug or 5 gal. bucket, as those larger containers cannot readily be squeezed by hand. Not only does such refilling add to the possibility of further liquid spilling on the ground, but actual usage has shown that after 2–3 squeezings of the 8 oz. containers, they tend to lose their shape and resiliency, making it even more difficult to discharge the chunky viscous liquid easily through the tire valve in carrying out the tire charging. Add to this the further tendency of the liquid to itself clog the tire valve in use, the further problem results in even more-and-more spillage and spurting of the sealant under the squeezing force of the container, making the operation all the more messy.

Were this not bad enough, experience has shown the inordinate time spent in effectively carrying out this injection process. That is, even with the skilled user of the tire sealant, it takes approximately 10 minutes to so charge a medium size passenger car tire. To deal, instead, with a commercial truck tire requiring 36 ounces, or so, of this same tire sealant to do a comparable job typically takes more than four times as much effort, commonly taking 45 minutes of manual squeezing—without even considering the added time spent in having to refill the 8 oz. container from the larger jug or bucket size and having to clean up the attendant spillage and mess. Whereas one might accept spending upwards of most one hour to so treat the 4 tires and spare of a medium passenger vehicle, treating just one truck of a commercial fleet having 8–10 tires could take an entire day. This follows not only from the added number of tires to be treated, but from the much larger size of the tires employed. Although not so much of an added burden as a commercial tractor-trailer truck, the situation with off-the-road vehicles or box trucks still reflect the far greater effort required than with medium size passenger cars, because of their accepted need for some 16 ounces of tire sealant fluid to do the job of protecting against blowouts and flat tires.

OBJECTS OF THE INVENTION

It is an object of the present invention, therefore, to overcome these disadvantages as inherent in the prior art.

It is another object of the invention to provide some type of apparatus which will allow the tire sealing fluid to be injected mechanically, rather than by manually through the squeezing of the 8 oz., or so, container which typifies the prior art injection of the liquid into the tire.

It is also an object of the invention to provide such a manner mechanically injecting this sealant fluid quickly, easily, and with a minimum of mess or fluid wastage.

It is yet a further object of the invention to provide a new and improved method of allowing this sealant to be injected, at a cost not only which is reasonable, but which represents a highly positive trade-off compared to the work and labor saved.

SUMMARY OF THE INVENTION

As will be seen from the following description, the present invention comprises a new and improved tire sealant dispenser apparatus operative with the valve of the pneumatic tire. As will become clear, the apparatus employs a housing of length and cross-sectional dimension to enclose the amount of tire sealing fluid required by the pneumatic tire to be treated—whether it be a bicycle tire, a motorcycle tire, a small passenger car tire, a medium passenger car tire, an off-the-road vehicle tire or a commercial fleet-type tractor-trailer tire. Thus, and in accordance with the invention, a preferred embodiment will be seen to include a housing of tubular construction of an inside diameter and length so as to enclose up to substantially 36 ounces of tire sealing fluid.

Further, and in accordance with the invention, an input port is provided on the housing along with a tank valve coupled to a source of compressed air. With the housing having an output port fitted with a hose—preferably of a flexible vinyl composition—, the application of compressed air through the valve serves to charge the tire sealant through the hose and into the pneumatic tire valve over which the opposite end of the vinyl hose is fitted. With the housing being constructed of a 1½ in. outer diameter tubing, and of a substantially 28 in. length, testing has shown that a tube of such polyvinylchloride composition results to discharge the tube's contents with 150 lbs. of applied pressure in the order of 10 seconds for a 36 oz. fill. As will be appreciated, with the apparatus of the invention, no need exists to continually refill any 8 oz. container, with its attendant spillage, and the treating of all tires accomplished easily, with almost no manual labor involvement, and exceedingly fast. Of course, with only 8 oz. or less of the sealant required for tires smaller than those on commercial fleet vehicles, the injection of the sealant will be seen to be even faster.

With this in mind, it will also be apparent how the apparatus of the invention can find use not only by a fleet operator, or by a lay person just wanting to protect his automobile tires against puncture, but can also find extensive use in automotive service stations and tire sales centers, where motorists usually go to purchase new or replacement tires.

BRIEF DESCRIPTION OF THE DRAWING

These and other features of the present invention will be more clearly understood from a consideration of the following description, taken in connection with the sole FIGURE of the Drawing which shows a preferred embodiment of a tire sealant dispenser apparatus according to the invention, for use with a pneumatic tire valve.

DETAILED DESCRIPTION OF THE DRAWING

Figure 1:
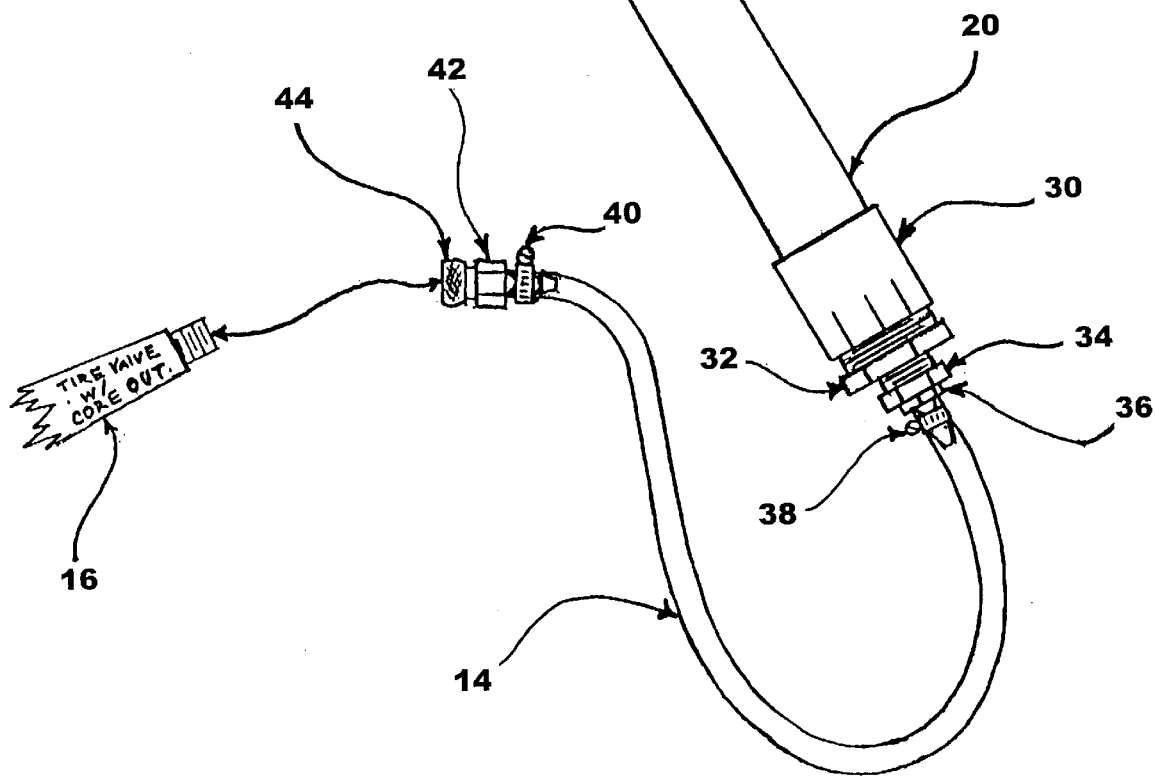

In the Drawing, the tire sealant dispenser apparatus 10 includes a housing 12, preferably of tubular pipe construction, and typically of polyvinylchloride composition. A flexible hose 14 is included, of a clear vinyl composition, for example, and of a length to enable comfortable coupling on one end to the pneumatic valve 16 of the tire to be treated (with its core removed), and at the other end to the housing 12, allowing the user to either bend over or to stand in filling the tire with the sealant. In a preferred construction of this invention, a ¼ in. inside diameter clear vinyl hose 14 was employed, along with a 1½ in. outside diameter polyvinylchloride tube 12.

An input port 18 is indicated on the pipe housing 12 for introducing the tire sealing fluid into the housing, while an output port is indicated at 20 for discharging the tire sealing fluid from the housing 12 into the hose 14. At the input port 18, a tank valve 22 (preferably of Schrader type) is shown, along with a pipe plug 24, a reduction bushing 26 and a coupling 28. With the 1½ in. tube 12, the pipe plug 24 is selected of a ¾ in. outer diameter, to couple with a 1½ in.–¾ in. reduction bushing 26 in joining to the coupling 28 which overlies the tube 12 and exhibiting a 1½ in. outside diameter.

At the output port end 20 of the housing 12, on the other hand, a like coupling 30 is employed, along with a comparable 1½ in.–¾ in. reduction bushing 32 and ¾ in. pipe plug 34. A ¼ in. male-thread barbed hose fitting 36 is provided, to couple with one end of the vinyl hose 14, which is there held in place by a ⅜ in. hose clamp—the fitting 36 being preferably selected of brass, and with the hose clamp 38 being constructed of stainless steel. At the other, opposite end of the vinyl hose 14, a like hose clamp 40 is employed, to tighten the hose 14 with a female-thread barbed hose fitting 42 of ¼ in. diameter analogous to that the male-thread barbed hose fitting 36. Likewise constructed of brass, the female-thread barbed hose fitting 42 then couples by a male pipe thread 44 (preferably of brass), to the female-thread tire valve 16.

In use, when it is desired to inject the tire sealant viscous fluid into a tire to treat it so as to seal these punctures of up to ⅛ in. diameter, the pipe plug 24 and tank valve 22 are unscrewed, the applicable amount of sealant (e.g. 4 oz., 6 oz., 8 oz., 16 oz., 36 oz.) is added, the plug 24 and valve 22 screwed back on, and the coupling 44 screwed onto the threads of the tire valve—or vice versa, with the coupling 44 being screwed on the tire valve first, then followed by the filling of the tube enclosure 12 its required amount. With the tank valve 22 then being connected to a source of compressed air—e.g. 150 lbs.—, the tire sealant liquid and the rubber chunks disbursed therein are injected into the tire, through the valve 16, in just a matter of a few seconds. With the male-threaded pipe 44 then continuing in place, the pipe plug 24 and the tank valve 22 can be unscrewed, and additional sealant added, if necessary, to further fill the tire if of a larger size. With the plug 24 and tank valve 22 being then screwed back in, a second, or further, charge of compressed air injects the additional sealant in the further treating of the tire to protect against blowouts or puncturing.

A one gal. jug of tire sealant viscous liquid typically sells at retail for $35.00, while a 5 gal. bucket sells for $150.00. With the invention as described, analysis has indicated that it can be priced to sell for $30.00 and less—thereby making the pneumatic liquid dispenser apparatus of the invention not only a clean, effective time saving device, but one which can be manufactured to sell and priced attractively.

While there has been described what is considered to be a preferred embodiment of the present invention, it will be readily appreciated by those skilled in the art that modifications can be made without departing from the scope of the teachings herein. Thus, whereas the present invention has been described in the context of an enclosure and hose of certain composition and size, other compositions and sizes can be selected equally as well, and with fittings and bushings of any appropriate selection as well—all the while continuing to operate in allowing the use of compressed air to discharge the sealant instead of the heretofore use of the manual squeezing of an 8 oz. or so container. For at least these reasons, and the attendant advantages associated with the invention, resort should be had to the claims appended hereto for a true understanding of the scope of the invention.

I claim:

1. Tire sealant dispensing apparatus operative with a pneumatic tire valve, comprising:

a flexible hose having first and second ends;

a tire sealing viscous fluid:

a housing of length and cross-sectional dimension to enclose a given amount of said viscous fluid and holdable at any angle between horizontal and vertical;

an input port on said housing for introducing said viscous fluid into said housing; and an output port on said housing for discharging said viscous fluid from said housing as desired;

with said output port on said housing being coupled with said first end of said hose;

with said input port on said housing including a tank valve coupled to a source of compressed air;

and with said second end of said hose coupled to said pneumatic tire valve;

whereby, with the charging of said housing by said source of compressed air, the tire sealing viscous fluid within said housing is injected via the pressure of said compressed air through said hose and through said pneumatic valve into a tire to protect against later blowouts or punctures of the tire in use.

2. The apparatus of claim 1 wherein said second end of said hose is coupled to said pneumatic tire valve by means of a pipe thread coupling over said tire valve.

3. The apparatus of claim 2 wherein said first end of said hose is coupled to said output port on said housing by means of a threaded fitting.

4. The apparatus of claim 3 wherein there are further included a pair of hose clamps for securing said hose with said pneumatic tire valve and with said output port on said housing, respectively.

5. The apparatus of claim 3 wherein there is also included a first plug incorporating said tank valve cooperating with said input port on said housing, and wherein there is additionally included a second plug cooperating with said threaded fitting at said output port of said housing.

6. The apparatus of claim 1 wherein said housing is of a length and cross-sectional dimension to enclose up to substantially 36 oz. of tire sealing viscous fluid.

7. The apparatus of claim 1 wherein said tire sealing viscous fluid includes chunks of raw rubber.

* * * * *